US010317858B2

(12) United States Patent
Ray et al.

(10) Patent No.: US 10,317,858 B2
(45) Date of Patent: Jun. 11, 2019

(54) ARCHITECTURE AND METHOD FOR CENTRALLY CONTROLLING A PLURALITY OF BUILDING AUTOMATION SYSTEMS

(75) Inventors: Arup Ratan Ray, Bangalore (IN); Murugesan Muthukrishnan, Chennai (IN)

(73) Assignee: Infosys Technologies, Ltd., Bangalore (IN)

( * ) Notice: Subject to any disclaimer, the term of this patent is extended or adjusted under 35 U.S.C. 154(b) by 652 days.

(21) Appl. No.: 13/328,916

(22) Filed: Dec. 16, 2011

(65) Prior Publication Data
US 2012/0259466 A1  Oct. 11, 2012

(30) Foreign Application Priority Data
Apr. 7, 2011  (IN) .......................... 1187/CHE/2011

(51) Int. Cl.
*G05B 15/02* (2006.01)

(52) U.S. Cl.
CPC ...... *G05B 15/02* (2013.01); *G05B 2219/2642* (2013.01)

(58) Field of Classification Search
CPC .. G05B 23/0267; G05B 15/02; G05B 19/042; G05B 19/4188; G05B 19/41885; G05B 2219/2642; G05B 2219/31196; G05B 2219/31472; G05B 2219/32136; G05B 2219/32379
USPC ................................ 715/772, 859; 700/272
See application file for complete search history.

(56) References Cited

U.S. PATENT DOCUMENTS

| 7,894,943 B2* | 2/2011 | Sloup et al. ................... 700/276 |
| 2005/0190054 A1* | 9/2005 | Scott ..................... G05B 23/027 340/517 |
| 2007/0005191 A1* | 1/2007 | Sloup et al. ................... 700/276 |
| 2009/0106345 A1* | 4/2009 | Landgraf ........... G05B 19/4185 709/201 |
| 2009/0204590 A1* | 8/2009 | Yaskin et al. ..................... 707/3 |
| 2009/0210071 A1* | 8/2009 | Agrusa et al. ................... 700/9 |
| 2009/0210814 A1* | 8/2009 | Agrusa et al. ................. 715/772 |
| 2010/0257137 A1* | 10/2010 | Escribano Bullon et al. .............. 707/623 |
| 2011/0149974 A1* | 6/2011 | Sakamoto et al. ............ 370/394 |
| 2011/0178977 A1* | 7/2011 | Drees ..................... G05B 15/02 706/52 |
| 2012/0303150 A1* | 11/2012 | Krishnaswamy .. G05B 23/0251 700/110 |
| 2014/0114867 A1* | 4/2014 | Volkmann .............. G06Q 10/06 705/308 |

FOREIGN PATENT DOCUMENTS

WO  WO 2008150815 A2 * 12/2008

* cited by examiner

*Primary Examiner* — Jason Lin
(74) *Attorney, Agent, or Firm* — Pepper Hamilton LLP

(57) ABSTRACT

A framework for centrally controlling a plurality of building automation systems. The architecture and method automates a plurality of existing and new building automation systems comprising access control, HVAC, fire safety etc. in such a way that the plurality of building automation systems can be monitored and controlled from a central dashboard. The central dashboard effectively monitors, takes right decisions and remotely controls the buildings across the globe from a centralized location.

15 Claims, 2 Drawing Sheets

ARCHITECTURE AND METHOD FOR CENTRALLY CONTROLLING A PLURALITY OF BUILDING AUTOMATION SYSTEMS

This application claims the benefit of Indian Patent Application Filing No. 1187/CHE/2011, filed Apr. 7, 2011, which is hereby incorporated by reference in its entirety.

TECHNICAL FIELD

The present disclosure relates to field of building automation. In particular, embodiments of the present disclosure relates to a framework for centrally controlling a plurality of building automation systems.

BACKGROUND

Presently, all huge buildings are installed with a building automation system which provides monitoring and control of the mechanical equipment as well as electrical components installed in the building. Such building automation system collects data, performs alarm analysis, schedules equipment operations and provides interfacing to other services such as ventilation, electrical, plumbing and other miscellaneous alarm monitoring.

In a conventional automated building, there will be automation for HVAC (heating, ventilation and air conditioning), security, electrical and fire fighting systems etc. Presently, these building automation systems are disparate systems which imply that HVAC, security, electrical and fire fighting systems are stand alone systems. These stand alone systems do not communicate with each other. Hence, there is no way of aggregating the data from different data sources of each of these systems. This makes the user of these systems to refer to data of different building automation subsystems manually and then take decision regarding management of the building. This might take long time to monitor and analyze the data and hence the decision may not be happening at real time. Further, the conventional systems use proprietary protocols and legacy technologies such as OPC, BACNet, Lon Works, MODBUS to communicate data from devices to Control layer and then to Supervision layer. With these legacy technologies, building interoperable, scalable solutions was not possible due to the lack of automation standard based on web services standard.

In the conventional systems, one building automation system in a building is not integrated with other building automation systems within the same building and across multiple buildings which are geographically distant. Hence, the conventional system has not been integrated to monitor and control all utilities available in a plurality of buildings from a central location. Therefore, there exists a need to develop an architecture and a method for centrally monitoring and controlling plurality of building automation systems.

SUMMARY OF THE DISCLOSURE

In one embodiment, the present disclosure relates to an architecture for centrally controlling a plurality of building automation systems. The architecture comprises a data access layer which extracts data from plurality of building automation systems. Upon extraction, the data access layer determines priority of the data. In case the priority is below a predetermined priority level, the data is stored in a standard format in a database. The architecture also comprises a business layer configured to process the stored data and generate a result, based on user request. Further, a service layer of the architecture exposes the standard format data and the result in an OPC UA format. The service layer is connected to user interface layer which accesses the data and the result represented in the OPC UA format to centrally control the plurality of building automation systems.

In one embodiment, the present disclosure relates to a method for centrally controlling a plurality of building automation systems. The method comprises extracting data from the plurality of building automation systems and storing the data in a standard format in a database. Subsequently, the method determines priority of the data and upon determination of the priority below a predetermined priority level, storing the data in a standard format in a database. In addition, the method involves processing the stored data and generating a result based on user request. Further, the standard format data and the result are represented in an OPC UA format. Finally, the data and the result represented in the OPC UA format are accessed to centrally control the plurality of building automation systems.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

Figure 1:
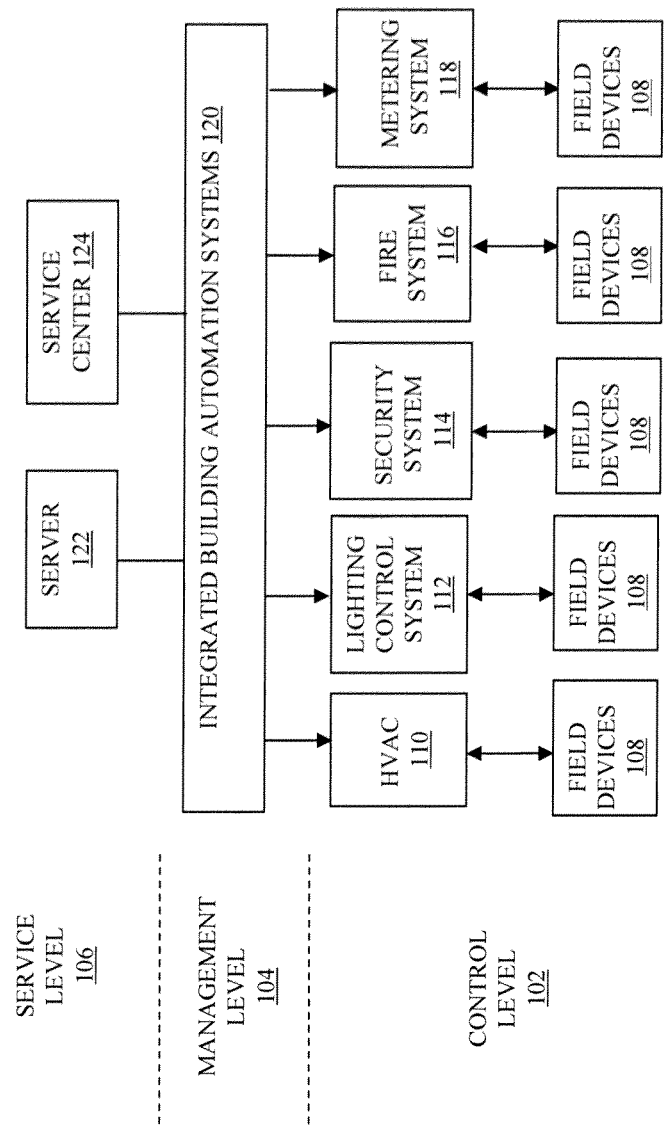
FIG. 1 illustrates a system for centrally controlling a plurality of building automation systems in accordance with the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates to field of building automation. In particular, embodiments of the present disclosure relates to a framework for centrally controlling a plurality of building automation systems.

Accordingly, the present disclosure relates to an architecture for centrally controlling a plurality of building automation systems, the architecture comprises a data access layer for extracting data from the plurality of building automation systems; determining priority of the data; upon determination of the priority below a predetermined priority level, storing the data in a standard format in a database; a business layer for processing the stored data and generating a result based on an user request; a service layer for representing the standard format data and the result in an OPC UA format; and an user interface layer in connection with the service layer to access the data and the result represented in the OPC UA format to centrally control the plurality of building automation systems.

In one embodiment of the present disclosure, upon determination of the data above the predetermined priority level, the data access layer transfers the data to the service layer without storing the data in the database; the service layer represents the data in the OPC UA format; and the user interface layer accesses the data represented in OPC UA format to centrally control the plurality of building automation systems.

In another embodiment of the present disclosure, the data access layer provides for accessing the standard format data from the database.

In yet another embodiment of the present disclosure, the data extracted from the plurality of building automation systems are in different formats.

In still another embodiment of the present disclosure, the business layer comprises an access control unit configured to authenticate the user access to the database.

In another embodiment of the present disclosure, the result generated by the business layer comprises at least one of a report and a performance value of the plurality of building automation systems.

In yet another embodiment of the present disclosure, the service layer comprises a System Application and Products (SAP) connector to connect the building automation system with an enterprise solution.

In still another embodiment of the present disclosure, the user interface layer is configured to display at least one of the report generated using the data stored in the database; an alarm signal; the performance value; energy consumed by the plurality of buildings; and video recording of the plurality of buildings.

In one embodiment, the present disclosure relates to a method for centrally controlling a plurality of building automation systems, the method comprising acts of extracting data from the plurality of building automation systems and storing the data in a standard format in a database; determining priority of the priority and upon determination of the priority below a predetermined priority level, storing the data in a standard format in a database; processing the stored data and generating a result based on an user request; representing the standard format data and the result in an OPC UA format; and accessing the data and the result as represented in the OPC UA format to centrally control the plurality of building automation systems.

In another embodiment of the present disclosure, upon determination of the data above the predetermined priority level, transferring the data to the service layer without storing the data in the database; representing the data in the OPC UA format; and accessing the data represented in OPC UA format to centrally control the plurality of building automation systems.

In yet another embodiment of the present disclosure, the access to the stored data is allowed upon authentication of the user.

In another embodiment of the present disclosure, the result generated comprises at least one of a report and a performance value of the plurality of building automation systems.

FIG. 1 illustrates system architecture for centrally controlling a plurality of building automation systems in accordance with the present disclosure. The system architecture is divided into three levels namely control level 102, management level 104 and service level 106. The control level 102 comprises field devices 108 including but are not limiting to sensors, actuators etc. The sensors measure the environmental data recorded from a plurality of building automation systems.

The present disclosure uses the sensors including but are not limiting to temperature sensors (for e.g. resistance temperature sensors, duct mounted sensors etc.), $CO_2$ sensors, occupancy sensors, relative humidity sensors, lighting control sensors (for e.g. photo sensors, ultrasonic control sensors, time based sensors), access control sensors (for e.g. fingerprint sensors, motion sensors, microwave sensors, infrared sensors etc.), metering system sensors (for e.g. water meter, electricity meter etc.), fire alarm sensors (e.g. heat sensors, smoke sensors etc.), water management sensors (for e.g. rain sensors), moisture sensors (for e.g. tensiometer, dielectric sensor etc.).

The control level 102 further comprises control networks including but not limited to BACNet, LONWORKS, MODBUS etc wherein different building automation subsystems are handled by different control networks. The building automation systems include HVAC 110, lighting control system 112, security system 114, fire system 116 and metering system 118 etc. The management level 104 allows integration of the plurality of building automation systems 120 to provide a uniform view to all the subsystems. The management level 104 manages functions like dashboard, historical trending, logs and reporting, and user profile and role management. The service level 106 of the system comprises of server 122 and one or more service centers 124. The service level provides plurality of building automation systems to be connected with the one or more service centers for providing remote monitoring, alarm and fault detection of the building automation systems.

Figure 2:
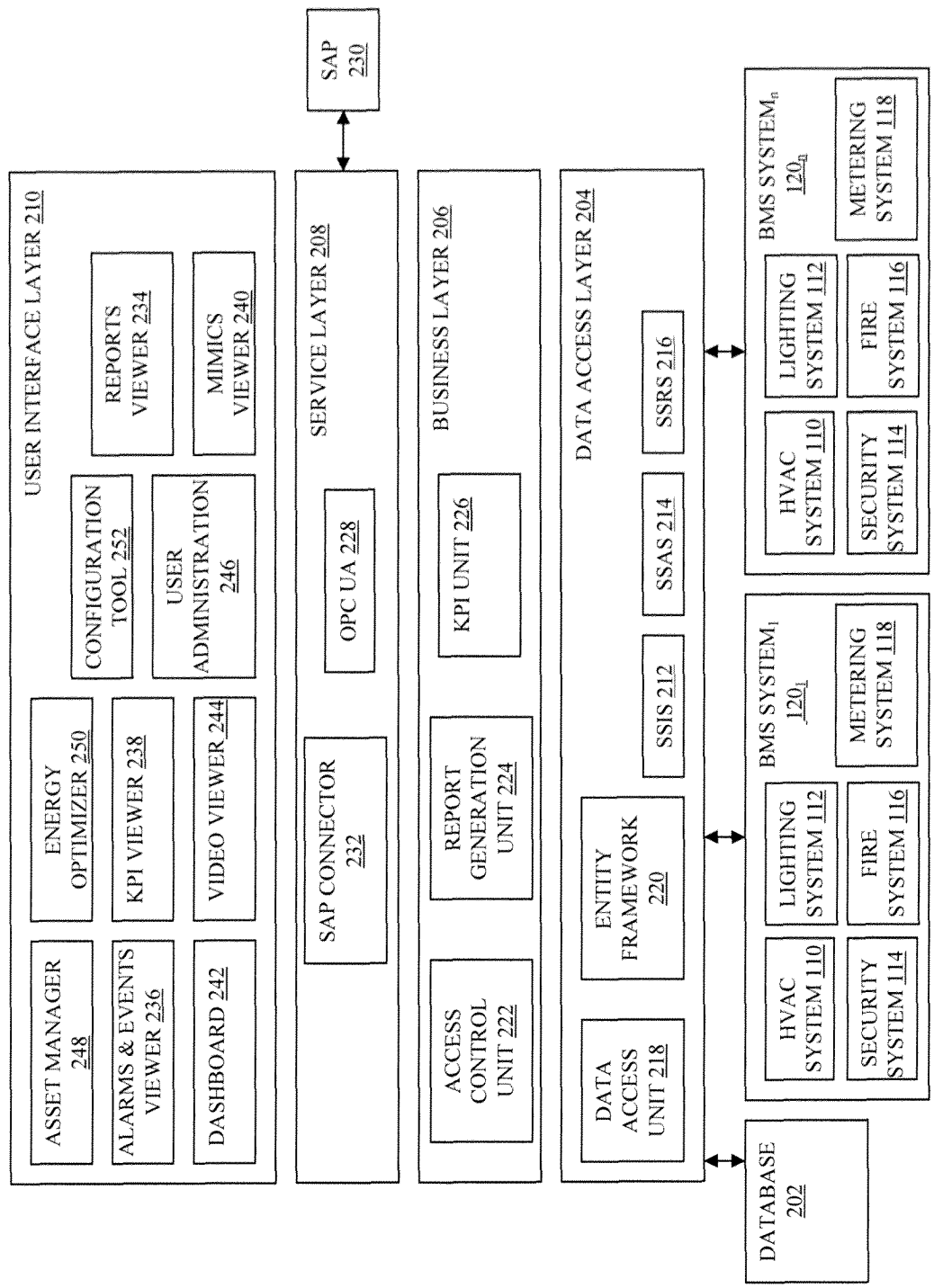
FIG. 2 illustrates an architecture for centrally controlling a plurality of building automation systems in accordance with the present disclosure.

FIG. 2 illustrates architecture for centrally controlling a plurality of building automation systems in accordance with the present disclosure. The architecture of present disclosure is connected to a plurality of building automation systems (BAS) ($120_1$ ... $120_n$, hereinafter collectively referred to as 120) and a database 202 for storing the data extracted from the building automation systems 120.

In an embodiment of the present disclosure, the plurality of building automation systems 120 are integrated to provide a centralized monitoring for cost-efficient and eco-friendly green buildings across multiple locations. The following BAS can be incorporated into the architecture of the present disclosure.

HVAC system 110 monitors and controls different heating, ventilation and air condition systems in a building. Lighting control system 112 analyzes the use of lighting in the building which in turn is used for energy management.

Metering system 118 is used to monitor the carbon footprint, emissions, water usage, and electricity usage to generate regular consumption reports. Security system 114 prevents the exchange of confidential information to unauthorized persons, networking sites and common forums. The security system 114 further prevents accessing entertainment and malicious sites. Intruder alarm system detects presence of any authorized person in an area and gives a warning to control room. Fire alarm system 116 is used to detect fire and send signal to trigger the alarm. Further, the fire alarm system 116 send a notification to the authorized personnel for taking appropriate action.

In addition to the above-mentioned BAS, the present invention can integrate the following automation systems into the present system. Access control system restricts entry of unauthorized persons into the building. Further, the access control system does not allow people to enter the building by carrying a data transfer device. Energy management system aims to reduce the carbon footprint of the business and lower Information Technology (IT) costs through efficient uses of power. Video surveillance system triggers digital video recording (DVR) for increased security. The surveillance system uses video cameras to transmit a signal on one or more monitors present at a specific place Attendance management system is used to monitor the attendance and access time of each individual. Transport management system manages transport vehicles including cabs, buses etc. Water management system monitors and manages water usage in a building. Waste management system detects addition of hazardous components to sewage and reports the detection for taking necessary action. Public addressing system informs people in the building about any emergency situations like fire alarm, intruder alarm, bomb threat etc. Power management system manages the usage of power in a building. Personal safety system helps in contacting emergency personnel in case of medical emergency.

The architecture comprises of layers namely data access layer 204, business layer 206, service layer 208 and user interface 210. The data access layer 204 is connected to the database 202 and BAS 120. The data access layer 204 comprises of one or more services including but not limited to SQL server integration services (SSIS) 212, SQL server analysis services (SSAS) 214 and SQL server reporting services (SSRS) 216. SSIS 212 extracts data of the plurality of building automation systems 120 from the database 202. The priority of the extracted data is determined by the data access layer. In case the determined priority is below a predetermined priority level, the data access layer 204 stores the data in an industry format in the database 202. The data access layers then transfers the data from the database to other layers as required. To the contrary, if the determined priority is above a predetermined priority level, the data access layer transfers the data to the service layer 208 without storing the data in the database. This feature helps in real time reporting of certain important events to the user. SSAS 214 supports online analytical processing of the stored data and data mining functionality. SSRS 216 supports a variety of server based report generation and this service can be administered via a web interface.

The data access layer 204 further comprises of a data access unit 218 that extracts the standard format data handled by different networks such as OPC, LONWORKS and MODBUS etc. from the different subsystems of the building and provides the data from the database to user interface layer 210. The data access layer 204 also comprises an entity framework 220 which maps the data between the data stored in the database and data needed by the other layers of the architecture. Above the data access layer 204, the business layer 206 is placed which processes the stored data and generates a result, based on user request. The business layer 206 comprises of an access control unit 222, a report generation unit 224, and a key performance indicator (KPI) unit 226. The access control unit 222 checks the privileges assigned for users in the user interface layer 210 accessing the system and allows accessing of data based on the privileges. The report generation unit 224 receives inputs from the user interface layer 210, i.e., the parameters required to generate the report. Upon receiving the inputs, the unit 224 connects to the data access layer 204 for gathering the data values of the parameters selected by the user for report generation. Further, the report generation unit 224 uses SSRS 216 for preparing a variety of interactive and printed reports. These reports can be viewed in web pages by a report viewer web control in the user interface layer 210, which embeds the reports in the web page itself. The KPI unit 226 calculates the performance of the indicators defined by the user by integrating any of the available calculation engines.

Next to the business layer 206 is service layer 208 which represents the data and the result received from the data access layer 204 and the business layer 206 respectively in an Open Connectivity Unified Architecture (OPC UA) format 228. The data from different building automation systems will be exposed as OPC data in the form of OPC UA standard. This enables any user with the appropriate permissions to connect to the service layer 208 and get the data and the necessary information there from. In one embodiment, the user acts as OPC UA client and the service layer 208 acts as OPC UA server. The service layer 208 is externally connected to System, Application and Products (SAP) 230 and comprises a SAP connector 232. The SAP connector 232 enables the communication of the present framework with enterprise solutions through SAP 230.

Above the business layer 206, user interface layer 210 is present which comprises of one or more clients. As an exemplary embodiment, FIG. 2 illustrates only one client. However, any number of clients having appropriate permissions can be connected with the OPC UA server. Further, each of these clients should be OPC UA compatible to be able to connect with the OPC UA server. The OPC UA client comprises one or more tools to display a variety of information to the user for centrally monitoring and controlling the plurality of building automation systems.

A report viewer tool 234 helps to view reports generated by the report generation unit 224 of the business layer 206. There shall be custom reports as well as reports that are generated on request. Custom reports are generated in a time period predefined by the system and the user is intimated about the report generation through email or short messaging service (SMS).

An alarms and events viewer tool 236 is used to view any alarms or events raised, with description, zone, type of the signal, priority, etc. The priority of the generated alarm is determined by the data access layer. In case the determined priority of the alarm is below a predetermined priority level, data access unit stores the alarm in a standard format in the database 202. The data access layers then transfers the alarm information from the database to other layers, as required. To the contrary, if the determined priority of the alarm is above a predetermined priority level, the data access layer transfers the alarm information to the service layer 208 without storing the alarm information in the database. This feature helps in responding quickly to emergency situations. This tool allows the user to filter and view the alarms based on the building/zone, priority, etc. After viewing the alarms, user acknowledges or clear the alarms depending on the role of the user (For example only admin is authorized to acknowledge or clear critical alarms). In addition, this tool displays basic events like operator manual action requests generated by the system, informational messages such as a change in a set point or tuning parameter by an operator.

A KPI viewer tool 238 is used to display the list of available key performance indicators for the system generated by the KPI unit 226 of the business layer 206. In the present disclosure, few default KPIs are defined such as reduction in energy utilization, reduction in operating costs, reduction in carbon foot print etc. In addition to the default KPI's, the KPI viewer tool defines different KPI's for individual BAS system based on the requirements. The KPI viewer tool views trends for the defined KPI's and displays the target and actual values for the KPI and reports any deviation from the target value.

A graphics viewer tool 240 enables the user to view the operation of the building data in a graphical format. This view consists of an architectural layout of the each zone of BAS implemented buildings. This tool allows the user to view the data from the different buildings and further allows providing the set-point as needed.

A dashboard 242 displays all the necessary information for the user in a single screen so the user does not have to look for details at multiple locations. Each user is allowed to create their dashboards according to the requirements.

A video viewer tool 244 enables the user to watch either the recorded feed of the surveillance system or online feed of the video. The snapshots from the recording can be copied to the clip-board and edited.

User administration tool 246 enables the privileges for any user logging into or accessing the system. The privileges assigned to user varied depending on the role assigned to the user. For example, user in admin role shall have the privilege to access and modify the entire system while user in guest role shall not have the privilege to modify the system.

A configuration tool 252 is used to perform one of the following functions namely, configuring one or more OPC UA clients, configuring one or more BAS, interfacing between BAS and the present system (deciding input/output data points to be exchanged), configuring different hardware's to be used for the communication of the data between BAS and the present system, configuration of the different viewers like different controllers and monitoring points of the different buildings, configuration of set-points and alarm points, and classification of data points whether it would be used in synthesis of reports or to be controlled by the BAS.

In addition to these tools, the OPC UA client comprises asset manager tool 248 which enables to track the assets of the organization, along with location, quantity, condition of the assets for financial accounting, preventive maintenance and theft deterrence. The tool 248 manages all asset deployments and the specifications, monitoring, calibration, costing and tracking from a single system.

An energy optimizer tool 250 provides energy consumption by the building, which helps the building management to come up with optimal solutions in conserving energy. Also, this unit 250 allows users to make changes in business logic for implementing energy saving mechanisms. Further, this tool suggests or recommends how the energy can be optimized based on the present building energy parameters.

The present disclosure conserves energy and optimizes the usage of resources in a building. The present disclosure also reduces the costs involved in managing a building. The present disclosure provides a one-stop solution to check and control the usage of resources in a building. In the present disclosure, the data is represented in OPC UA format which enables cross-platform web services, and interoperability. Further, the display of operation of building data in graphical format is very user-friendly.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A building automation computing device comprising a memory comprising programmed instructions stored thereon, the memory coupled to one or more processors configured to be capable of executing the stored programmed instructions to:

extract building automation systems data from a plurality of building automation systems;

integrate and store the extracted building automation systems data from the plurality of building automation systems into a database;

determine a priority of the integrated building automation systems data from the plurality of building automation systems stored in the database;

convert the extracted building automation systems data into an Open Connectivity Unified Architecture (OPC UA) format when the determined priority of the extracted building automation systems data exceeds a priority level, wherein the building automation systems data from at least a subset of the building automation systems is not extracted in the OPC UA format;

generate a result in the OPC UA format based on a received user request and the converted building automation systems data; and output a user interface to facilitate control of one or more of the building automation systems based on the converted building automation system data and the result in the OPC UA format.

2. The device as set forth in claim 1, wherein the building automation systems data comprises security information, heating, ventilation, or air conditioning (HVAC) information, fire control information, energy consumption information, or video recording from the plurality of buildings.

3. The device as set forth in claim 1, wherein the one or more processors are further configured to be capable of executing the stored programmed instructions to:

transfer the extracted building automation systems data to one of a plurality of network layers, when the determined priority of the extracted building automation systems data exceeds the priority level;

store the extracted building automation systems data at the database when the determined priority of the extracted building automation systems data does not exceed the priority level; and map the extracted building automation systems data stored at the database to other one of the plurality of network layers.

4. The device as set forth in claim 1, wherein the one or more processors are further configured to be capable of executing the stored programmed instructions to:

compare one or more portions of automation systems information in the building automation systems data with pre-defined key performance indicators, the pre-defined key performance indicators comprising operating cost indicators or carbon footprint indicators; and provide a report when the portions of the automation systems information deviates from one or more of the pre-defined key performance indicators by an established threshold.

5. The device as set forth in claim 1, wherein the one or more processors are further configured to be capable of executing the stored programmed instructions to:

extract energy consumption data from the plurality of building automation systems;

analyze the energy consumption data;

determine and output one or more energy optimization strategies based on the analyzed energy consumption data from the plurality of building automation systems.

6. A method for centrally controlling a plurality of building automation systems implemented by a building automation computing device, the method comprising:

extracting building automation systems data from a plurality of building automation systems;

integrating and storing the extracted building automation systems data from the plurality of building automation systems into a database;

determining a priority of the integrated building automation systems data from the plurality of building automation systems stored in the database;

converting the extracted building automation systems data into an Open Connectivity Unified Architecture (OPC UA) format when the determined priority of the extracted building automation systems data exceeds a priority level, wherein the building automation systems data from at least a subset of the building automation systems is not extracted in the OPC UA format;

generating a result in the OPC UA format based on a received user request and the converted building automation systems data; and outputting a user interface to facilitate control of one or more of the building automation systems based on the converted building automation system data and the result in the OPC UA format.

7. The method as set forth in claim 6, wherein the building automation systems data comprises security information, heating, ventilation, or air conditioning (HVAC) information, fire control information, energy consumption information, or video recording from the plurality of buildings.

8. The method as set forth in claim 6, further comprising:

transferring the extracted building automation systems data to one of a plurality of network layers, when the determined priority of the extracted building automation systems data exceeds the priority level;

storing the extracted building automation systems data at the database when the determined priority of the extracted building automation systems data does not exceed the priority level; and mapping the extracted building automation systems data stored at the database to other one of the plurality of network layers.

9. The method as set forth in claim 6, further comprising:

comparing one or more portions of automation systems information in the building automation systems data with pre-defined key performance indicators, the pre-defined key performance indicators comprising operating cost indicators or carbon footprint indicators; and providing a report when the portions of the automation systems information deviates from one or more of the pre-defined key performance indicators by an established threshold.

10. The method as set forth in claim 6, further comprising:

extracting energy consumption data from the plurality of building automation systems;

analyzing the energy consumption data; and determining and outputting one or more energy optimization strategies based on the analyzed energy consumption data from the plurality of building automation systems.

11. A non-transitory computer readable medium having stored thereon instructions for centrally controlling a plurality of building automation systems comprising machine executable code which when executed by at least one processor, causes the processor to:

extract building automation systems data from a plurality of building automation systems;

integrate and store the extracted building automation systems data from the plurality of building automation systems into a database;

determine a priority of the integrated building automation systems data from the plurality of building automation systems stored in the database;

convert the extracted building automation systems data in an Open Connectivity Unified Architecture (OPC UA) format when the determined priority of the extracted building automation systems data exceeds a priority level, wherein the building automation systems data from at least a subset of the building automation systems is not extracted in the OPC UA format;

generate a result in the OPC UA format based on a received user request and the converted building automation systems data; and output a user interface to facilitate control of one or more of the building automation systems based on the converted building automation system data and the result in the OPC UA format.

12. The medium as set forth in claim 11, wherein the building automation systems data comprises security information, heating, ventilation, or air conditioning (HVAC) information, fire control information, energy consumption information, or video recording from the plurality of buildings.

13. The medium as set forth in claim 11, wherein the machine executable code when executed by the processor further causes the process to:

transfer the extracted building automation systems data to one of a plurality of network layers, when the determined priority of the extracted building automation systems data exceeds the priority level;

store the extracted building automation systems data at the database when the determined priority of the extracted building automation systems data does not exceed the priority level; and map the extracted building automation systems data stored at the database to other one of the plurality of network layers.

14. The medium as set forth in claim 11, wherein the machine executable code when executed by the processor further causes the process to:
compare one or more portions of automation systems information in the building automation systems data with pre-defined key performance indicators, the pre-defined key performance indicators comprising operating cost indicators or carbon footprint indicators; and
provide a report when the portions of the automation systems information deviates from one or more of the pre-defined key performance indicators by an established threshold.

15. The medium as set forth in claim 11, wherein the machine executable code when executed by the processor further causes the process to:
extract energy consumption data from the plurality of building automation systems;
analyze the energy consumption data;
determine and output one or more energy optimization strategies based on the analyzed energy consumption data from the plurality of building automation systems.

* * * * *